(12) United States Patent
Drysdale et al.

(10) Patent No.: US 7,608,645 B2
(45) Date of Patent: *Oct. 27, 2009

(54) DUAL CURE COATING COMPOSITIONS

(75) Inventors: Neville Everton Drysdale, Newark, DE (US); Laura Ann Lewin, Greenville, DE (US); Robert John Barsotti, Franklinville, NJ (US); Gary A. Johansson, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 460 days.

This patent is subject to a terminal disclaimer.

(21) Appl. No.: 11/241,484

(22) Filed: Sep. 30, 2005

(65) Prior Publication Data

US 2006/0128873 A1    Jun. 15, 2006

Related U.S. Application Data

(60) Provisional application No. 60/615,359, filed on Sep. 30, 2004.

(51) Int. Cl.
  *C08J 3/28* (2006.01)
(52) U.S. Cl. .................. 522/134; 525/421; 525/423; 525/430; 525/439; 525/424; 525/426; 525/431; 528/55
(58) Field of Classification Search .............. 522/134; 525/375, 423, 421, 424, 430, 439, 426, 431; 528/55
See application file for complete search history.

(56) References Cited

U.S. PATENT DOCUMENTS

| 4,539,376 | A | | 9/1985 | Goel et al. | |
|---|---|---|---|---|---|
| 4,549,005 | A | | 10/1985 | Goel | |
| 4,628,102 | A | * | 12/1986 | Goel | 548/218 |
| 4,654,416 | A | * | 3/1987 | Goel | 528/403 |
| 4,661,583 | A | * | 4/1987 | Goel | 528/322 |
| 4,661,600 | A | * | 4/1987 | Goel | 548/217 |
| 4,704,409 | A | * | 11/1987 | Goel | 521/156 |
| 4,708,971 | A | * | 11/1987 | Goel et al. | 521/167 |
| 4,721,767 | A | * | 1/1988 | Goel | 528/55 |
| 7,135,530 | B2 | * | 11/2006 | Drysdale et al. | 525/423 |
| 2006/0069204 | A1 | * | 3/2006 | Drysdale et al. | 524/589 |
| 2006/0074198 | A1 | * | 4/2006 | Drysdale et al. | 525/347 |
| 2006/0128774 | A1 | * | 6/2006 | Drysdale et al. | 514/375 |

FOREIGN PATENT DOCUMENTS

| WO | WO 97/31073 | 8/1997 |
|---|---|---|
| WO | WO 2005/035613 A1 | 4/2005 |

OTHER PUBLICATIONS

LuJean Burak, Advantages of the UV/EB Curing Process and Recommended Safety Practices, Mar. 27 2001, Sartomer Co. (pp. 1-6) http://www.pcimag.com/Articles/Feature_Article/0168e8e5e56a7010VgnVCM100000f932a8c0_.*
U.S. Appl. No. 60/509,885, filed Oct. 9, 2003.
U.S. Appl. No. 10/960,656, filed Oct. 7, 2004.
U.S. Appl. No. 60/615,362, filed Sep. 30, 2004.
U.S. Appl. No. 11/241,403, filed Sep. 30, 2005.
U.S. Appl. No. 60/615,363, filed Sep. 30, 2004.
U.S. Appl. No. 11/241,481, filed Sep. 30, 2005.
PCT International Search Report for International Application No. PCT/US2005/035413 dated Mar. 3, 2001 and the Written Opinion of the International Searching Authority.

* cited by examiner

*Primary Examiner*—Mark Eashoo
*Assistant Examiner*—Jessica Paul

(57) ABSTRACT

The present invention relates to the use of (meth)acrylate functionalized amide acetals as reactive components with crosslinking agents and UV radiation to give new coatings compositions.

5 Claims, No Drawings

DUAL CURE COATING COMPOSITIONS

CROSS REFERENCE TO RELATED APPLICATION

This application claims the benefit of U.S. Provisional Application 60/615,359, filed Sep. 30, 2004.

FIELD OF THE INVENTION

The present invention relates to the use of methacrylate functionalized amide acetals for dual cure (isocyanates/UV) coating compositions.

BACKGROUND OF THE INVENTION

Amide acetals have been used for example in copolymerization with polyisocyanates as disclosed in U.S. Pat. No. 4,721,767. Cross-linked amide acetal based coating compositions dry and cure rapidly without the potential problems created by VOC emissions. Such coatings can be very useful, for example, in the automotive coatings industry.

Co-owned and co-pending US Patent Publication 2005-007461 describes polymeric compositions containing amide acetal groups, which are crosslinked by hydrolyzing the amide acetal groups, and subsequently reacting the hydroxyl groups and/or the amine functions that are formed to crosslink the composition.

Co-owned and co-pending U.S. patent application Ser. No. 10/960,656 describes a catalytic process for making amide acetals from nitrites and diethanolamines.

Co-owned and co-pending U.S. Patent Application 60/615,362 describes the sythesis of these (meth)acrylate functionalized amide acetals, and is hereby incorporated by reference in its entirety.

Co-owned and co-pending U.S. Patent Application 60/615,363 describes the use of (meth)acrylate functionalized amide acetals in single-cure coatings.

The crosslinking (curing) of polymers is an important commercial activity, useful, for example, in elastomers, in coatings, and in thermoset materials such as are used for electronics. Controlling when and under what conditions crosslinking takes place is usually critical since once a polymer is crosslinked it is usually not "workable," that is it may not be reshaped. In some applications, such as coatings and electronic applications it may be desirable or even mandatory that no lower molecular weight compounds be volatilized during or after the crosslinking of the polymers, so as not to contaminate sensitive equipment such as electronics, and/or to pollute the environment, as in the case of coatings.

Numerous ways have been found to avoid the production of volatile compounds during curing. For example, the reaction of epoxy groups with other groups such as hydroxyl groups may accomplish this result, but it is sometimes difficult to control after the ingredients are mixed. Furthermore, higher temperatures may be required for this operation. To avoid these types of problems, especially in coatings which often must be cured under conditions close to ambient conditions and which often must be stable for long periods before curing, other solutions have been found, such as the use of spiro-orthoesters, see for example World Patent Application 9731073. However new and/or improved methods of crosslinking polymers are needed.

For coatings, basecoat-clearcoat systems have found wide acceptance in the past decade as automotive finishes. Continuing effort has been directed to such coating systems to improve the overall appearance, the clarity of the topcoat, and the resistance to deterioration. Further effort has been directed to the development of coating compositions having low volatile organic content (VOC). A continuing need exists for coating formulations which provide outstanding performance characteristics after application.

In repairing damage, such as dents to auto bodies, the original coating in and around the damaged area is typically sanded or ground out by mechanical means. Some times the original coating is stripped off from a portion or off the entire auto body to expose the bare metal underneath. After repairing the damage, the repaired surface is coated, preferably with low VOC coating compositions, typically in portable or permanent low cost painting enclosures, vented to atmosphere to remove the organic solvents from the freshly applied paint coatings in an environmentally safe manner. Typically, the drying and curing of the freshly applied paint takes place within these enclosures. Furthermore, the foregoing drying and curing steps take place within the enclosure to also prevent the wet paint from collecting dirt or other contaminants in the air.

As these paint enclosures take up significant floor space of typical small auto body paint repair shops, these shops prefer to dry and cure these paints as fast as possible. More expensive enclosures are frequently provided with heat sources, such as conventional heat lamps located inside the enclosure to cure the freshly applied paint at accelerated rates. Therefore, to provide more cost effective utilization of shop floor space and to minimize fire hazards resulting from wet coatings from solvent based coating compositions, there exists a continuing need for low VOC fast curing coating formulations which cure under ambient conditions while still providing outstanding performance characteristics.

The curing of coatings by UV and EB is well known to those skilled in the art. See Chemistry and Technology of UV and EB Formulation for Coatings, Inks and Paints, Volume IV, Formulation, by C. Lowe, et al., John Wiley & Sons, New York, 1996.

The present invention allows for a dual-cure coating system, whereby the coating can be crosslinked by reaction with a crosslinker, such as isocyanate, and subsequently cured additionally by exposure to UV or electron beam (EB) energy.

SUMMARY OF THE INVENTION

The present invention relates to a composition, comprising:

a (meth)acrylate amide acetal of the formula

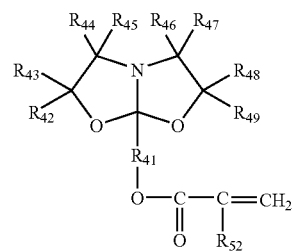

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino;

$R_{41}$ is $(CR_{50}R_{51})_n$ wherein $R_{50}$ and $R_{51}$ are hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group;

$R_{52}$ is hydrogen or methyl;

n is 1-10;

a crosslinking moiety; and a UV catalyst.

The invention further relates to a process for forming a coating composition comprising (meth)acrylate amide acetals, said process comprising reacting a (meth)acrylate amide acetal with a crosslinking moiety to produce a crosslinked coating, and subsequently exposing said crosslinked coating to UV radiation.

The present invention further relates to coatings made by the disclosed process, having improved coating properties. The coatings may be part of a basecoat-clearcoat system.

DETAILS OF THE INVENTION

Co-owned and co-pending U.S. Patent Application 60/615,362 describes the sythesis of (meth)acrylate-functionalized amide acetals, and is hereby incorporated by reference in its entirety. These hydroxy amide acetals are then reacted with materials capable of crosslinking. Both the pre-crosslinked and crosslinked materials form coatings, with the crosslinked ones generally used as such.

The formula for these (meth)acrylate amide acetals is

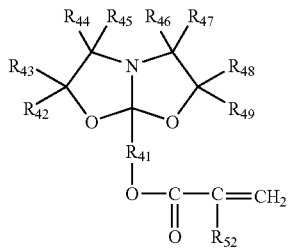

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino; and $R_{41}$ is $(CR_{50}R_{51})_n$, wherein $R_{50}$ and $R_5$, are hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group;

where n is 1-10, and where $R_{52}$ is either hydrogen or methyl. It is more typical that $R_{42}$-$R_{49}$ each independently represent hydrogen and $C_1$-$C_{10}$ alkyl groups.

Generally, these (meth)acrylate amide acetals are reacted with crosslinking moieties such as isocyanates to form coatings, followed by subsequent UV radiation. Other mechanisms of forming coatings are disclosed in co-owned and co-pending U.S. Pat. Application No. 60/615,363. The coatings are generally polymeric in nature.

By polymers herein are meant those entities with number average molecular weight from about 100 to about 100,000. Preferably, the number average molecular weight of the polymers is from about 100 to about 10000.

By oligomers herein is meant those polymers which have a number average molecular weight less than about 3000.

In the crosslinkable compositions herein, amide acetals groups are present in some form (see below), and the crosslinking reaction can be initiated when water comes in contact with these groups to hydrolyze them. By water is meant water in the pure form, moisture, moist air, moist gas or mixture of gases, or any other aqueous or non-aqueous media in which water may be present in a homogeneous or a heterogeneous mixture. Such media may be in the liquid form or the gaseous form.

When the amide acetal is simply hydrolyzed, amino hydroxy ester is formed which then converts to the amide diol as illustrated below. The amino hydroxy ester and the amide diol exist simultaneously as the reaction of conversion of the amino hydroxy ester to amide diol can be controlled by time, temperature, pH, and the urethane forming catalyst present in the reaction mixture. An advantage of the amide diol is that it demonstrates minimal yellowing in the finished product, before reacting with crosslinking agent. A rapid reaction with the cross-linking agent avoids the yellowing of the amine functionality in the product. Both of these hydrolyzed products are cross-linking agents because of the presence of their dual reactive side. In the case of the amino hydroxy ester the reactive sites are the secondary amine and the hydroxyl groups. In the case of the amide diol the reactive groups are the hydroxyls or diol:

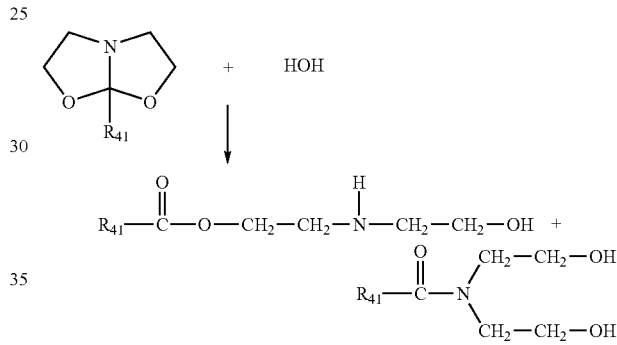

Note that in this reaction, no relatively volatile low molecular weight products are produced. Since these reactions may be acid catalyzed some of the ring opening of the amide acetal may lead to cationic polymerization rather than simple ring opening. Herein preferably the major molar portion of the amide acetal present may simply ring open and do not polymerize, more preferably at least about 75 mole percent, and especially preferably at least 90 molar percent may simply ring open and do not polymerize. The polymerization occurs generally at high temperatures. It is of course recognized that, although only one amide acetal group is shown (i.e., the case when m=1), this reaction would apply for m=2, 3 and 4 as well.

In the compositions, and in the materials used in the processes herein, the amide acetal groups may be included by a variety of methods. In one instance, the amide acetal may be included as a "monomeric" compound, which may hydrolyze, thus providing reactive hydroxyl groups.

Alternatively, the amide acetal groups may be part of a (possibly low molecular weight) polymer. For example a dihydroxy amide acetal (which has not yet been hydrolyzed) may be reacted with an excess of a diisocyanate such as bis(4-isocyanatophenyl)methane (MDI), toluene diisocyanate (TDI), hexamethylene diisocyanate (HMDI) or isophorone diisocyanate (IPDI) to form an isocyanate ended "prepolymer", which upon exposure to water undergoes hydrolysis of the amide acetal forming hydroxyl groups, which react with the remaining isocyanate groups to crosslink the polymer. Since amide acetal often hydrolyze faster than isocyanate reacts with water, this is believed to be main mode of the crosslinking reaction for this type of polymer. Other diols such as ethylene glycol or 1,4-butanediol may also be copolymerized into the (pre)polymer formed. It is noted that in this type of isocyanate containing (pre)polymer, the amide acetal group is (at least before hydrolysis) part of the main chain (not on a branch) of the polymer formed.

Alternately, the amide acetal may be functionalized, for example, via reaction of (mono)hydroxy amide acetal with isocyanate to give urethane amide acetal, or with diisocyanates, for example, 1,6-hexamethylene diisocyanate, to give diurethane diamide acetals, or DESMODUR 3300 which contains multifunctional isocyanates, a triisocyanate, to give the corresponding multifunctional urethane amide acetals. Many of these compounds are novel.

An example of the cross-linking agent, or second polymer with functional groups capable of reacting with hydroxyl or secondary amines, for

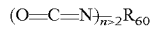

the amide acetal is as follows:

wherein $R_{60}$ is a hydrocarbyl structure.

Examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylylene diisocyanate.

Additional examples of suitable polyisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega -dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane4,4'-diisocyanate, a toluene diisocyanate, 1,3-bis(1-isocyanato1-methylethyl)benzene, 1,4-bis(1-isocyanato-1-methylethyl)benzene, 1,3-bis(isocyanatomethyl) benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis (isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (available under the trademark Desmodur® N from Bayer Corporation of Pittsburgh, Pa.), the adduct of 1 molecule of trimethylol propane and 3 molecules of toluene diisocyanate (available under the trademark Desmodur® L from Bayer Corporation), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

In one instance a first polymer containing intact (before hydrolysis) amide acetal groups, and a crosslinking agent containing first functional groups react with hydroxyl or secondary amine groups. The crosslinking agent may be a monomeric compound such as a diisocyanate such as MDI, TDI, HMDI or IPDI, or an epoxy resin, or may be a polymer containing first functional groups. For example it may be (meth)acrylate copolymer containing repeat units derived from 2-isocyanatoethyl (meth)acrylate or glycidyl (meth) acrylate. It is also possible that the first polymer and the crosslinking agent are "combined" in the same polymer. For example one can copolymerize an amide acetal with 2-isocyanatoethyl (meth)acrylate or glycidyl (meth)acrylate and optionally other copolymerizable monomers. When that single polymer is exposed to moisture, presumably the amide acetal groups will hydrolyze forming amino hydroxy groups (which eventually convert to hydroxyl groups as shown previously), which in turn will react with the isocyanate, carboxylic acid anhydride, melamine, silane(s) or epoxide groups, whichever are present. These materials may be combined as a single polymer or may be more than one substance.

In one preferred embodiment of this invention, a second polymer which has second functional groups capable of reacting with hydroxyl or secondary amines has a number average molecular weight less than 3000. A preferred functionality for this second polymer is isocyanate.

A specific example of the cross-linking agent, or second polymer with functional groups capable of reacting with hydroxyl or secondary amines, used here is the Desmodur® 3300 compound from Bayer. The idealized structure of Desmodur® 3300 is given as follows (also, pentamer, heptamer and higher molecular weight species can be present):

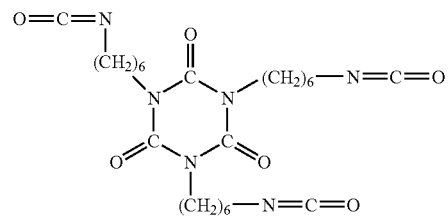

The amide acetal may also be present in the polymer as part of a branch. For example, a monohydroxylamide acetal may be converted to a (meth)acrylate ester by esterification and the resulting (meth)acrylic ester,

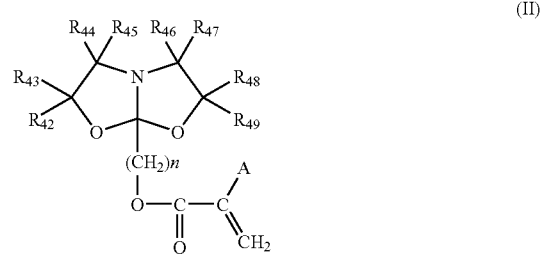

where A is H for acrylates and $CH_3$ for meth(acrylates), may be free radically copolymerized with other free radically copolymerizable monomers such as meth(acrylates) and styrenes. Analogous variations will be obvious to the skilled artisan.

Also present in these compositions, as amide acetals and the processes in which they are used, is a material having a first or second functional group which reacts with hydroxyl or secondary amine groups. This reaction should take place under the conditions chosen for the crosslinking reaction. These conditions may be ambient conditions or heating or other conditions that may be used to prod the reaction to proceed. Preferably the reaction with hydroxyl or secondary amine groups should not produce any volatile low molecular weight compounds, except those normally found in air ($CO_2$, water, etc.) Typical groups which react with hydroxyl or secondary amine groups include isocyanates (including isocyanurate trimers), epoxides, carboxylic acid anhydrides (especially those which are parts of polymers), melamine, and silane(s). Isocyanates, melamine and silane are especially preferred for coatings.

In any of the compositions herein, the polymeric materials may range from relatively low to relatively high molecular weight. It is preferred that they be of relatively low molecular weight so as to keep the viscosity of the compositions before crosslinking low, so as to avoid or minimize the need for solvent(s).

The compositions herein may contain water. It is to be understood that as the water contacts the amide acetal groups present in the composition, the amide acetal groups will start to hydrolyze, eventually leading to crosslinking of the composition. The water may be introduced in a variety of ways. For example, especially in the case of a coating the water may introduced into the uncrosslinked or crosslinking (while the crosslinking is taking place) coating by absorption from the air. This is very convenient for making an uncrosslinked coating composition which is stable until exposed to (moist) air. Alternatively water may be mixed in a mixing head or spray mixing head (for a coating) just before crosslinking is to take place. This is particularly useful for making thicker crosslinked items such as electronic encapsulants where diffusion of moisture into a thicker section will take longer. The introduction of water can be at a point where the final shape of the polymeric crosslinked part can be formed before crosslinking takes place.

Other materials which may optionally be present in the compositions and processes include one or more solvents (and are meant to act only as solvents). These preferably do not contain groups such as hydroxyl or primary or secondary amino which can react with either the first or second functional groups and/or amide acetals. One or more catalysts for the hydrolysis of amide acetals may be present. These are typically Brönsted acids, but these acids should not be so strong as cause substantial cationic ring opening polymerization of the amide acetals and/or epoxides which may be present. If substantial cationic ring opening polymerization of amide acetal groups takes place, this can often lead to premature crosslinking of the composition. The same caveats may be said for any catalysts which may be present which catalyze the reaction of hydroxyl groups or the amino hydroxy groups with the first or second functional groups. What these catalysts may be will depend on what the first or second functional group(s) present are. Such catalysts are known in the art.

Some of the suitable catalysts for polyisocyanate can include one or more tin compounds, tertiary amines or a combination thereof; and one or more aforedescribed acid catalyst. Suitable tin compounds include dibutyl tin dilaurate, dibutyl tin diacetate, stannous octoate, and dibutyl tin oxide. Dibutyl tin dilaurate is preferred. Suitable tertiary amines include triethylene diamine. One commercially available catalyst that can be used is Fastcat® 4202 dibutyl tin dilaurate sold by Elf-AtoChem North America, Inc. Philadelphia, Pa. It is acknowledged that one skilled in the art could use acetic acid or such weak acids to block the activity of the catalyst.

The present compositions, and the process for making them crosslinked, are useful as encapsulants, sealants, and coatings. The coating composition of this invention can be used as a clear coat that is applied over a pigmented base coat that may a pigmented version of the composition of this invention or another type of a pigmented base coat. The clear coating can be in solution or in dispersion form.

Typically, a clear coating is then applied over the base coating before the base coating is fully cured, a so called "wet-on-wet process", and the base coating and clear coating are then fully cured at ambient temperatures or can be cured by heating to elevated temperatures of 40° C. to 100° C. for 15 to 45 minutes. The base coating and clear coating preferably have a dry coating thickness ranging from 25 to 75 microns and 25 to 100 microns, respectively. By "crosslinker functionality" is meant is the average number of functional groups per molecule. If the functionality of the crosslinker is too low, disruption of the basecoat flake orientation may occur. This disruption is measured by flop. The higher the value of flop the lower the amount of flake orientation disruption. Less disruption of the flake orientation is seen with a crosslinker which has >3.1 average functionality and a viscosity at 100% solids at 23C. of >700 mPas, preferably >900 mPas, and most preferably >1000 mPas. These values are measured with a color measurement device and compared to a commercial standard.

The novel coating composition may be used as a base coat or as a pigmented monocoat topcoat. Both of these compositions require the presence of pigments. Typically, a pigment-to-binder ratio of 0.1/100 to 200/100 is used depending on the color and type of pigment used. The pigments are formulated into mill bases by conventional procedures, such as, grinding, sand milling, and high speed mixing. Generally, the mill base comprises pigment and a dispersant in an aqueous medium. The mill base is added in an appropriate amount to the coating composition with mixing to form a pigmented coating composition.

Any of the conventionally-used organic and inorganic pigments, such as, white pigments, like, titanium dioxide, color pigments, metallic flakes, such as, aluminum flake, special effects pigments, such as, coated mica flakes, coated aluminum flakes and the like and extender pigments can be used. It may be desirable to add flow control additives.

The novel coating composition may be used as a primer in which case typical pigments used in primers would be added, such as, carbon black, barytes, silica, iron oxide and other pigments that are commonly used in primers in a pigment-to-binder ratio of 150/100 to 300/100.

The coating composition can be applied by conventional techniques, such as, spraying, electrostatic spraying, dipping, brushing, and flow coating.

The coating composition is particularly useful for the repair and refinish of automobile bodies and truck bodies and parts as a clear coat, pigmented base coat, or as a primer. The novel composition has uses for coating any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, large commercial aircraft and small pleasure aircraft, pleasure vehicles, such as, snow mobiles, all terrain vehicles, personal watercraft, motorcycles, and boats. The novel composition also can be used as a coating for industrial and commercial new construction and maintenance thereof; cement and wood floors; walls of commercial and residential structures, such as, office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signs; fiberglass structures; sporting goods; and sporting equipment.

This makes these coatings particularly useful for repainting of transportation vehicles in the field. An advantage of the present materials and processes in encapsulants and sealants is that when amide acetals are used in crosslinking reactions the resulting product does not shrink, or shrink as much as usual in a typical crosslinking reaction. This means any volume to be filled by the crosslinked material will be more reliably filled with a reduced possibility of voids being present due to shrinkage during crosslinking.

For whatever uses they are put to, the compositions, and the materials used in the processes described herein may contain other materials which are conventionally used in such uses. For example, for use as encapsulants and sealants the composition may contain fillers, pigments, and/or antioxidants.

For coatings there may be a myriad of other ingredients present, some of which are described below. In particular there may be other polymers (especially of low molecular weight, "functionalized oligomers") which are either inert or have functional group(s) other than those that may act as the materials comprising amide acetals and also react with other reactive materials in the coating composition.

Representative of the functionalized oligomers that can be employed as components or potential cross-linking agents of the coatings are the following:

Acid Oligomers: The reaction product of multifunctional alcohols such as pentaerythritol, hexanediol, trimethylol propane, and the like, with cyclic monomeric anhydrides such as hexahydrophthalic anhydride, methylhexahydrophthalic anhydride, and the like.

Hydroxyl Oligomers: The above acid oligomers further reacted with monofunctional epoxies such as butylene oxide, propylene oxide, and the like.

Anhydride Oligomers: The above acid oligomers further reacted with ketene.

Silane Oligomers: The above hydroxyl oligomers further reacted with isocyanato propyltrimethoxy silane.

Epoxy Oligomers: The diglycidyl ester of cyclohexane dicarboxylic acid, such as Araldite® CY-184 from Ciba Geigy, and cycloaliphatic epoxies, such as ERL®-4221, and the like from Union Carbide.

Aldimine Oligomers: The reaction product of isobutyraldehyde with diamines such as isophorone diamine, and the like.

Ketimine Oligomers: The reaction product of methyl isobutyl ketone with diamines such as isophorone diamine.

Melamine Oligomers: Commercially available melamines such as CYMEL® 1168 from Cytec Industries, and the like.

AB-Functionalized Oligomers: Acid/hydroxyl functional oligomers made by further reacting the above acid oligomers with 50%, based on equivalents, of monofunctional epoxy such as butylene oxide or blends of the hydroxyl and acid oligomers mentioned above or any other blend depicted above.

CD-Functionalized Crosslinkers: Epoxy/hydroxyl functional crosslinkers such as the polyglycidyl ether of Sorbitol DCE-358® from Dixie Chemical or blends of the hydroxyl oligomers and epoxy crosslinkers mentioned above or any other blend as depicted above.

The compositions of this invention may additionally contain a binder of a noncyclic oligomer, i.e., one that is linear or aromatic. Such noncyclic oligomers can include, for instance, succinic anhydride- or phthalic anhydride-derived moieties in the Acid Oligomers: such as described above.

Preferred functionalized oligomers have weight average molecular weight not exceeding about 3,000 with a polydispersity not exceeding about 1.5; more preferred oligomers have molecular weight not exceeding about 2,500 and polydispersity not exceeding about 1.4; most preferred oligomers have molecular weight not exceeding about 2,200, and polydispersity not exceeding about 1.25. Typically, compositions will comprise from about 20 to about 80 weight percent of the functionalized oligomer based on the total weight of amide acetal-containing compound in the coating. Preferably compositions will comprise from about 30 to about 70 weight percent of the functionalized oligomer based on the total weight of the amide acetal-containing compound in the coating. More preferably compositions will comprise from about 40 to about 60 weight percent of the functionalized oligomer based on the total weight of amide acetal-containing compound in the coating. Other additives also include polyaspartic esters, which are the reaction product of diamines, such as, isopherone diamine with dialkyl maleates, such as, diethyl maleate.

The coating compositions may be formulated into high solids coating systems dissolved in at least one solvent. The solvent is usually organic. Preferred solvents include aromatic hydrocarbons such as petroleum naphtha or xylenes; ketones such as methyl amyl ketone, methyl isobutyl ketone, methyl ethyl ketone or acetone; esters such as butyl acetate or hexyl acetate; and glycol ether esters such as propylene glycol monomethyl ether acetate.

The coating compositions can also contain a binder of an acrylic polymer of weight average molecular weight greater than 3,000, or a conventional polyester such as SCD®-1040 from Etna Product Inc. for improved appearance, sag resistance, flow and leveling and such. The acrylic polymer can be composed of typical monomers such as acrylates, methacrylates, styrene and the like and functional monomers such as hydroxy ethyl acrylate, glycidyl methacrylate, or gamma methacrylylpropyl trimethoxysilane and the like.

The coating compositions can also contain a binder of a dispersed acrylic component which is a polymer particle dispersed in an organic media, which particle is stabilized by what is known as steric stabilization. Hereafter, the dispersed phase or particle, sheathed by a steric barrier, will be referred to as the "macromolecular polymer" or "core". The stabilizer forming the steric barrier, attached to this core, will be referred to as the "macromonomer chains" or "arms".

The dispersed polymer contains about 10 to 90%, preferably 50 to 80%, by weight, based on the weight of the dispersed polymer, of a high molecular weight core having a weight average molecular weight of about 50,000 to 500,000. The preferred average particle size is 0.1 to 0.5 microns. The arms, attached to the core, make up about 10 to 90%, preferably 10 to 59%, by weight of the dispersed polymer, and have a weight average molecular weight of about 1,000 to 30,000, preferably 1,000 to 10,000. The macromolecular core of the dispersed polymer is comprised of polymerized acrylic monomer(s) optionally copolymerized with ethylenically unsaturated monomer(s). Suitable monomers include styrene, alkyl acrylate or methacrylate, ethylenically unsaturated monocarboxylic acid, and/or silane-containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. Optionally, the macromolecular core can be crosslinked through the use of diacrylates or dimethacrylates such as allyl methacrylate or post reaction of hydroxyl moieties with polyfunctional isocyanates. The macromonomer arms attached to the core can contain polymerized monomers of alkyl methacrylate, alkyl acrylate, each having 1 to 12 carbon atoms in the alkyl group, as well as glycidyl acrylate or glycidyl methacrylate or ethylenically unsaturated monocarboxylic acid for anchoring and/or crosslinking. Typically useful hydroxy-containing monomers are hydroxy alkyl acrylates or methacrylates as described above.

The coating compositions can also contain conventional additives such as pigments, stabilizers, rheology control agents, flow agents, toughening agents and fillers. Such additional additives will, of course, depend on the intended use of the coating composition. Fillers, pigments, and other additives that would adversely effect the clarity of the cured coating will not be included if the composition is intended as a clear coating.

The coating compositions are typically applied to a substrate by conventional techniques such as spraying, electrostatic spraying, roller coating, dipping or brushing. As mentioned above atmospheric moisture may "diffuse" into the coating and cause curing, or alternatively just before the coating is applied it is mixed with an appropriate amount of water, as in a mixing spray head. Under these latter conditions it is important to apply the coating before it crosslinks. The present formulations are particularly useful as a clear coating for outdoor articles, such as automobile and other vehicle body parts. The substrate is generally prepared with a primer and or a color coat or other surface preparation prior to coating with the present compositions.

A layer of a coating composition is cured under ambient conditions in the range of 30 minutes to 24 hours, preferably in the range of 30 minutes to 3 hours to form a coating on the substrate having the desired coating properties. It is understood that the actual curing time depends upon the thickness of the applied layer and on any additional mechanical aids, such as, fans that assist in continuously flowing air over the coated substrate to accelerate the cure rate. If desired, the cure rate may be further accelerated by baking the coated substrate at temperatures generally in the range of from about 60° C. to 150° C. for a period of about 15 to 90 minutes. The foregoing baking step is particularly useful under OEM (Original Equipment Manufacture) conditions.

In the present invention, the crosslinked coating is exposed to UV radiation at various wavelengths and fluxes. In order for the coating to be cured by UV radiation, a photoinitiator is added to the coating before cure and generally before crosslinking. There are many photoinitiators available for use in UV curing; any compound capable of generating radicals upon UV exposure is acceptable. One pertinent reference is "A Compilation of Photoinitiators" by Kurt Dietliker, 2002 SITA Technology Ltd., Edinburgh. Non-limiting examples of appropriate photoinitiators include Phenyl bis(2,4,6trimethylbenzoyl-phosphine oxide), generally in solution form, with acetone being one useful solvent.

These and other features and advantages of the present invention will be more readily understood, by those of ordinary skill in the art, from a reading of the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner slight variations above and below the stated ranges can be used to achieve substantially the same results as values within the ranges. Also, the disclosure of these ranges is intended as a continuous range including every value between the minimum and maximum values.

Unless otherwise stated, all chemicals and reagents were used as received from Aldrich Chemical Co., Milwaukee, Wis.

EXAMPLES

Example 1

The methacrylate amide acetal used in this series of experiments was made

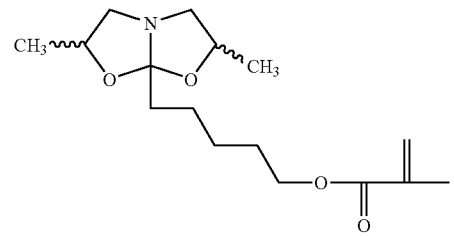

in accordance with the procedures found in co-pending and co-owned U.S. Patent Application 60/615,362, hereby incorporated by reference in its entirety.:

The following compositions were prepared:

Composition A (Control)

| | Wt (g) |
|---|---|
| Amide Acetal Methacrylate | 2.97 |
| Di-isocyantohexane | 1.68 |
| Dibutyl Tin Dilaurate (1.58 g in 3.42 g in propylene glycol methyl ether acetate (PGMEA)) | 0.05 |
| Dodecylbenzene Sulfonic Acid Solution (2.0 g in 3.0 g PGMEA) | 0.05 |

Procedure: The amide acetal methacrylate and the isocyanate were added to a vial. To the resulting solution was added the dibutyl tindilaurate solution. After a few minutes an exothermic reaction occurred. After the reaction cooled down the acid solution was added. The resulting solution was poured on two glass plates and allowed to dry over night, resulting in a slight cloudy soft coating. See below for UV exposure data.

Composition B:

| | Wt (g) |
|---|---|
| Amide Acetal Methacrylate | 2.97 |
| Di-isocyantohexane | 1.68 |
| Dibutyl Tin Dilaurate (1.58 g in 3.42 g of PGMEA) | 0.05 |
| Dodecylbenzene Sulfonic Acid Solution (2.0 g in 3.0 g PGMEA) | 0.05 |
| Phenyl bis(2,4,6-trimethylbenzoyl-Phosphine oxide) solution (UV catalyst; 6.59 g in 80 mL acetone) | 1.00 mL (via syringe) |

Procedure: The amide acetal methacrylate and the isocyanate were added to a vial. To the resulting solution was added the dibutyl tin dilaurate solution. After a few minutes an exothermic reaction occurred. After the reaction cooled down the acid solution was added, followed by the UV catalyst solution. The resulting solution was poured on two glass plates and allowed to dry over night, resulting in a slight cloudy soft coating. See below for UV exposure data.

Composition C:

| | Wt (g) |
|---|---|
| Amide Acetal Methacrylate | 2.33 |
| Di-isocyantohexane | 1.00 |
| Desmodur 3300 | 0.32 |
| Dibutyl Tin Dilaurate (1.58 g in 3.42 g of PGMEA) | 0.05 |
| Dodecylbenzene Sulfonic Acid Solution (2.0 g in 3.0 g PGMEA) | 0.05 |
| Phenyl bis(2,4,6-trimethylbenzoyl-Phosphine oxide) solution (UV Catalyst; 6.59 g in 80 mL acetone) | 0.90 mL (via syringe) |

Procedure: The amide acetal methacrylate and the isocyanates (Di-isocyantohexane Desmodur 3300) were added to a vial. To the resulting solution was added the dibutyl tindilaurate solution. After a few minutes an exothermic reaction occurred. After the reaction cooled down the acid solution was added, followed by the UV catalyst solution. The resulting solution was poured on two glass plates and allowed to dry over night, resulting in a clear tacky coating. See below for UV exposure data.

One of each of the plates were exposed to UV radiation as outlined below:

Belt Speed 20 ft/min.
UV A: 1143 mJ/cm2 (energy) (3.6 watts/cm2 (flux))
UV B: 356 mJ/cm2 (1.08 watts/cm2)
UV C: 29 mJ/cm2 (0.092 watts/cm2)

The hardness of the unexposed coating to that of the UV exposed coating were test and tabulated in the following table

| Composition | Unexposed (newtons/mm2) | UV Exposed (newtons/mm2) |
|---|---|---|
| A (control) | 0.29 | 0.27 (scan twice) |
| B | 0.49 | 124 (scan twice) |
| C | 0.15 | 151 (one scan) |

What is claimed is:

1. A composition, comprising:
a (meth)acrylate amide acetal of the formula

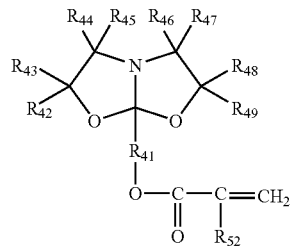

wherein $R_{42}$-$R_{49}$ independently represent a hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group, said alkyl, alkenyl, alkynyl, aryl, or aralkyl may each have one or more substituents selected from the groups consisting of halo, alkoxy, imino, and dialkylamino;

$R_{41}$ is $(CR_{50}R_{51})_n$ wherein $R_{50}$ and $R_{51}$ are hydrogen, $C_1$-$C_{20}$ alkyl, $C_1$-$C_{20}$ alkenyl, $C_1$-$C_{20}$ alkynyl, $C_1$-$C_{20}$ aryl, $C_1$-$C_{20}$ alkyl ester, or $C_1$-$C_{20}$ aralkyl group;

$R_{52}$ is hydrogen or methyl;

n is 1-10;

a crosslinking moiety; and a UV catalyst.

2. The composition of claim 1, wherein the crosslinking moiety is selected from the group consisting of isocyanates, epoxides, carboxylic acid anhydrides, melamines, and silane (s); and the UV catalyst is any compound capable of generating radicals upon UV exposure.

3. A process for forming a coating composition comprising (meth)acrylate amide acetals of claim 1, said process comprising reacting a (meth)acrylate amide acetal with a crosslinking moiety to produce a crosslinked coating, and subsequently exposing said crosslinked coating to UV radiation.

4. A coating made by the process of claim 3, having the properties of clarity and hardness.

5. The coating of claim 4 used as part of a basecoat-clearcoat system.

* * * * *

UNITED STATES PATENT AND TRADEMARK OFFICE
CERTIFICATE OF CORRECTION

PATENT NO. : 7,608,645 B2  Page 1 of 1
APPLICATION NO. : 11/241484
DATED : October 27, 2009
INVENTOR(S) : Drysdale et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Twelfth Day of October, 2010

David J. Kappos
*Director of the United States Patent and Trademark Office*